(12) United States Patent
Sakurai et al.

(10) Patent No.: US 6,617,038 B2
(45) Date of Patent: Sep. 9, 2003

(54) ELECTROMAGNETIC WAVE ABSORBING SILICONE RUBBER COMPOSITIONS

(75) Inventors: Ikuo Sakurai, Gunma-ken (JP); Akio Suzuki, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/983,659

(22) Filed: Oct. 25, 2001

(65) Prior Publication Data

US 2002/0077439 A1 Jun. 20, 2002

(30) Foreign Application Priority Data

Oct. 25, 2000 (JP) .......................................... 2000-324830

(51) Int. Cl.[7] .................................................. B32B 9/04
(52) U.S. Cl. .................... 428/447; 428/323; 428/328; 428/329; 252/62.51 R; 252/62.55; 524/440; 524/441; 524/442; 524/588
(58) Field of Search ................................ 428/447, 328, 428/323; 524/401, 440, 442, 588; 252/62.51 R, 62.55

(56) References Cited

U.S. PATENT DOCUMENTS 6,514,428 B2 * 2/2003 Suzuki et al. ................. 252/74

FOREIGN PATENT DOCUMENTS

| EP | 0 692 840 A1 | 1/1996 |
| EP | 1 146 085 A1 | 1/2001 |
| JP | 20000431198 | 2/2000 |
| JP | A2000-101284 | 4/2000 |
| JP | 2000294977 | 10/2000 |

* cited by examiner

Primary Examiner—Robert Dawson
Assistant Examiner—Christopher M. Keehan
(74) Attorney, Agent, or Firm—Birch, Stewart, Kolasch & Birch, LLP

(57) ABSTRACT

A silicone rubber composition comprising a soft magnetic powder, an optional heat conductive powder, and a surface treating agent selected from (a) an organopolysiloxane containing at least one alkoxy radical, hydroxyl radical or functional organic radical in a molecule, (b) a titanate coupling agent, and (c) an aluminum coupling agent is easily workable and flexible and has an ability to absorb electromagnetic waves and optionally, a heat transfer ability. Placement of the composition in an electronic equipment suppresses electromagnetic noise.

17 Claims, No Drawings

ELECTROMAGNETIC WAVE ABSORBING SILICONE RUBBER COMPOSITIONS

FIELD OF THE INVENTION

This invention relates to electromagnetic wave absorbing silicone rubber compositions having a good electromagnetic wave absorbing ability and flexibility.

BACKGROUND ART

With the advance toward a higher density and higher integration of CPU, MPU, LSI and other components used in electronic equipment such as personal computers and mobile phones, the generation of electromagnetic noise now poses technical and social problems. The traditional countermeasure to electromagnetic disturbances is to use electromagnetic shields made of electroconductive materials to prevent electromagnetic waves from entering the equipment interior and from emanating from within the equipment interior. The electromagnetic shielding of this type can induce malfunctions because electromagnetic waves confined within the equipment interior give rise to electromagnetic interference.

In the prior art, an artisan with specialized knowledge and experience of noise suppression must be engaged in taking a countermeasure against disturbances by electromagnetic interference. It is a time-consuming task to find an effective countermeasure. Another drawback is that an electronic component in question must be previously given an extra space for mounting a shield.

To solve these problems, engineers are interested in electromagnetic absorbers which absorb electromagnetic waves for thereby reducing reflected and transmitted waves. Known electromagnetic absorbers include sintered soft ferrite and composite materials obtained by dispersing soft magnetic powder in matrices such as rubber and resins. The sintered soft ferrite is brittle and difficult to process, and the range of its application is limited because it suffers a sharp decline of its electromagnetic absorbing ability in a high frequency region. On the other hand, the composite materials having electromagnetic wave-absorbing soft magnetic powder dispersed in matrices such as rubber and resins are easy to process, but difficult to fill the soft magnetic powder to a high density, often failing to provide a high electromagnetic wave absorbing ability. Even if a high packing density is achievable, the resulting electromagnetic absorbers become hard and brittle and hence, very difficult to handle. Especially when the soft magnetic powder is of a metal base material such as iron or iron alloy, high packing is difficult because the powder is poorly wettable with silicone.

The same trend toward a higher density and higher integration of CPU, MPU, LSI and other components used in electronic equipment encounters the problem of increased heat release. Ineffective cooling will cause thermal runaway or undesired effects, giving rise to malfunction. One typical means for effectively radiating heat to the exterior is to dispose heat transfer media such as silicone grease and silicone rubber filled with heat conductive powder between CPU, MPU or LSI and heat sinks for reducing the contact thermal resistance therebetween. This means, however, cannot avoid the problem of electromagnetic interference within the equipment interior.

JP-A 2000-101284 discloses an electromagnetic absorber comprising an electromagnetic wave absorbing layer containing soft magnetic particles, a binder and an organic silane compound. It is described nowhere to use rubber as the binder. The composition described therein is effective for increasing the strength, but does not allow for high loading of soft magnetic particles.

When it is desired to have both an electromagnetic wave absorbing ability and a heat transfer ability, a soft magnetic powder and optionally, a heat conductive powder must be dispersed in a matrix such as rubber or resin. To impart a satisfactory electromagnetic wave absorbing ability and a satisfactory heat transfer ability, in particular, the increased loading of such powders is indispensable, but difficult with the state-of-the-art technology.

SUMMARY OF THE INVENTION

An object of the invention is to provide an electromagnetic wave absorbing silicone rubber composition having a satisfactory electromagnetic wave absorbing ability as well as improved workability and flexibility. Another object of the invention is to provide an electromagnetic wave absorbing silicone rubber composition having both a satisfactory electromagnetic wave absorbing ability and a satisfactory heat transfer ability as well as improved workability and flexibility.

It has been found that the above object is achieved by blending a soft magnetic powder, especially a soft magnetic powder of iron or iron alloy in silicone rubber and by further blending a specific surface treating agent therein for allowing the powder to be loaded in a larger amount. The same effect is achievable when a heat conductive powder is additionally blended in the silicone rubber. The surface treating agent used herein is selected from among (a) an organopolysiloxane containing at least one silicon atom-bonded alkoxy radical, silicon atom-bonded hydroxyl radical or functional organic radical in a molecule, (b) a titanate coupling agent, and (c) an aluminum coupling agent.

Specifically, when the surface treating agent selected from the above (a), (b) and (c) is blended in an electromagnetic absorber having a soft magnetic powder, especially a soft magnetic powder of iron or iron alloy, dispersed in silicone rubber, an electromagnetic wave absorbing silicone rubber composition is obtained which possesses a satisfactory electromagnetic wave absorbing ability and is easily workable and flexible.

Also, when both a soft magnetic powder, especially a soft magnetic powder of iron or iron alloy, and a heat conductive powder are dispersed in silicone rubber, and the surface treating agent selected from the above (a), (b) and (c) is blended therein, an electromagnetic wave absorbing silicone rubber composition is obtained which possesses both a satisfactory electromagnetic wave absorbing ability and a satisfactory heat transfer ability and is easily workable and flexible.

DESCRIPTION OF THE PREFERRED EMBODIMENT

Briefly stated, the electromagnetic wave absorbing silicone rubber composition of the invention is arrived at by blending a soft magnetic powder in silicone rubber and further blending a surface treating agent. A preferred embodiment of the composition is arrived at by blending a soft magnetic powder and a heat conductive powder in silicone rubber and further blending a surface treating agent. In this embodiment, the composition in the cured state preferably has a thermal conductivity of at least 2.0 W/mK. The surface treating agent used herein is selected from among (a) an organopolysiloxane containing at least one silicon atom-bonded alkoxy radical, silicon atom-bonded hydroxyl radical or functional organic radical in a molecule, (b) a titanate coupling agent, and (c) an aluminum coupling agent.

The soft magnetic powder in the electromagnetic wave absorbing silicone rubber composition is preferably iron or an iron alloy. Soft magnetic materials are generally divided into ferrite base materials and metal base materials. The ferrite base materials exhibit a good electromagnetic wave absorbing ability only in a relatively low frequency region and so, their application is somewhat limited. Then the metal base materials are preferable. Among the metal base materials, iron and iron alloys are more preferable because they keep a good electromagnetic wave absorbing ability up to a relatively high frequency side and are inexpensive. Illustrative, non-limiting, examples of the iron alloy include Fe—Cr, Fe—Si, Fe—Ni, Fe—Al, Fe—Co, Fe—Al—Si, Fe—Cr—Si, and Fe—Si—Ni alloys. The soft magnetic powder may be of one type or a mixture of two or more types. The soft magnetic powder particles may be either of flat or granular shape or a mixture thereof.

The soft magnetic powder (particles) should preferably have a mean particle size of about 0.1 μm to about 100 μm and especially about 1 μm to about 50 μm. Particles with a particle size of less than 0.1 μm have too large a specific surface area, probably failing to achieve a high packing density. With a particle size of more than 100 μm, the electromagnetic wave absorbing ability of soft magnetic powder per unit weight may become insufficient, especially on the high frequency side, fine asperities develop on the surface of the silicone rubber composition, and the contact thermal resistance become high when the heat transfer ability is necessary.

In a preferred embodiment, the soft magnetic powder is blended in an amount to account for 5 to 80%, especially 20 to 70% by volume of the entire silicone rubber composition. Less than 5% by volume of the soft magnetic powder may fail to impart the desired electromagnetic wave absorbing ability whereas more than 80% by volume may result in a silicone rubber composition which is hard and brittle. Preferably, the silicone rubber composition is cured into a part capable of achieving a noise attenuation of more than about 5 dB, especially more than about 10 dB at the desired frequency, when used with electronic equipment components.

When the silicone rubber composition is used in an area where heat transfer is necessary, a heat conductive powder is preferably used in combination with the soft magnetic powder in order to provide a high heat transfer capability. In this embodiment, the silicone rubber composition in the cured state preferably has a thermal conductivity of at least 2.0 W/mK and especially at least 3.0 W/mK.

The heat conductive powder used herein is typically selected from metals such as copper and aluminum, metal oxides such as alumina, silica, magnesia, red iron oxide, beryllia, and titania, metal nitrides such as aluminum nitride, silicon nitride and boron nitride, and silicon carbide, though not limited thereto.

Preferably the heat conductive powder has a mean particle size of about 0.1 μm to about 100 μm, especially about 1 μm to about 50 μm. Particles with a particle size of less than 0.1 μm have too large a specific surface area, probably failing to achieve a high packing density. With a particle size of more than 100 μm, fine asperities may develop on the surface of the silicone rubber composition, and the contact thermal resistance become large.

The heat conductive powder is used for the purposes of achieving closer packing with the soft magnetic powder and increasing the thermal conductivity of the composition. The amount of the heat conductive powder is preferably 10 to 85% by volume of the entire composition. The amount of the soft magnetic powder and the heat conductive powder combined is preferably 15 to 90%, especially 30 to 80% by volume of the entire composition. If the amount of the soft magnetic powder and the heat conductive powder combined is less than 15 vol %, little improvement in thermal conductivity is made. If the amount of the soft magnetic powder and the heat conductive powder combined exceeds 90 vol %, the composition may become hard and very brittle.

In either embodiment, the electromagnetic wave absorbing silicone rubber composition contains a surface treating agent selected from among (a) an organopolysiloxane containing at least one silicon atom-bonded alkoxy radical, silicon atom-bonded hydroxyl radical or functional organic radical in a molecule, (b) a titanate coupling agent, and (c) an aluminum coupling agent.

The organopolysiloxane containing at least one silicon atom-bonded alkoxy radical, silicon atom-bonded hydroxyl radical or functional organic radical in a molecule (a) is exemplified by those of the general formula (1) below, though not limited thereto.

(1)

Herein, $R^1$ is OH or $R^3$. $R^2$ is OH, an alkoxy radical of 1 to 6 carbon atoms (e.g., methoxy and ethoxy), or —$(CH_2)_pNH_2$ wherein p is an integer of 1 to 10. $R^3$ is a monovalent hydrocarbon radical of 1 to 16 carbon atoms, for example, alkyl radicals such as methyl and ethyl, alkenyl radicals such as vinyl and allyl, and aryl radicals such as phenyl, with methyl being especially preferred. Letter m is an integer of 1 to 100, preferably 5 to 80, more preferably 10 to 50, and n is 1, 2 or 3. Preferred examples of —$SiR^2_nR^3_{3-n}$ are —$Si(OCH_3)_3$, —$Si(OC_2H_5)_3$, —$Si(CH_3)_2OH$ and —$Si(CH_3)_2C_3H_6NH_2$.

The titanate coupling agent (b) includes, for example, isopropyltristearoyl titanate and tetra(2,2-diallyloxymethyl-1-butyl)bis(ditridecyl)phosphate titanate, though is not limited thereto.

The aluminum coupling agent (c) includes, for example, acetoalkoxyaluminum diisopropylates, though is not limited thereto.

The surface treating agent is preferably used in an amount of 0.1 to 10 parts by weight, and especially 0.2 to 8 parts by weight per 100 parts by weight of the soft magnetic powder. With less than 0.1 part of the surface treating agent, the surface treatment of powder particles therewith may become insufficient to fill a large amount of the soft magnetic powder, and the silicone rubber composition may become hard and less flexible. With more than 10 parts of the surface treating agent, the content of the soft magnetic powder and optional heat conductive powder is accordingly reduced, sometimes failing to achieve the desired electromagnetic wave absorbing ability and heat transfer ability.

The method of treating the soft magnetic powder and heat conductive powder with the surface treating agent is divided into a direct method of treating the powder directly with the agent and an integral blend method of adding the agent during the mixing of silicone with the powder. The direct method includes a dry method of directly treating the powder using a mixer capable of applying high shear stresses such as a Henschel mixer or super-mixer, and a wet method of adding the powder to a solution of the agent to form a slurry which is admixed. The surface treating agent may be introduced into the electromagnetic wave absorbing silicone rubber composition according to the invention by any of the above-mentioned methods although the method is not limited thereto.

The silicone rubber compositions used herein include unvulcanized putty-like silicone compositions and in the case of cured type, rubber-like compositions and gel-like compositions, though are not limited thereto.

Where the heat transfer ability is necessary, an electromagnetic wave absorbing silicone rubber composition having a lower rubber hardness in the cured state is preferred for improving the close contact with electronic equipment components or heat sinks and reducing the contact thermal resistance at the interface. It is thus recommended to use, among others, silicone rubber compositions of the low hardness type and silicone gel compositions. The rubber hardness in the cured state is preferably up to 80, especially up to 50 in Asker C hardness.

In the unvulcanized putty-like silicone compositions, silicone rubber compositions or silicone gel compositions, the base polymer may be a conventional organopolysiloxane, preferably of the following average compositional formula (2).

$$R^4_a SiO_{(4-a)/2} \tag{2}$$

Herein, $R^4$ is independently a substituted or unsubstituted monovalent hydrocarbon radical, and "a" is a positive number from 1.98 to 2.02.

In formula (2), $R^4$, which may be the same or different, stands for substituted or unsubstituted monovalent hydrocarbon radicals, preferably having 1 to 10 carbon atoms, more preferably 1 to 8 carbon atoms, for example, unsubstituted monovalent hydrocarbon radicals including alkyl radicals such as methyl, ethyl, propyl, isopropyl, butyl, isobutyl, tert-butyl, hexyl and octyl; cycloalkyl radicals such as cyclohexyl; alkenyl radicals such as vinyl and allyl; aryl radicals such as phenyl and tolyl; aralkyl radicals such as benzyl, phenylethyl and phenylpropyl; and substituted monovalent hydrocarbon radicals including the foregoing radicals in which some or all of the hydrogen atoms attached to carbon atoms are substituted with halogen atoms, cyano and other radicals, for example, halogenated alkyl radicals and cyano-substituted alkyl radicals such as chloromethyl, bromoethyl, trifluoropropyl and cyanoethyl. Of these, methyl, phenyl, vinyl and trifluoropropyl radicals are preferable. More preferably methyl accounts for at least 50 mol %, especially at least 80 mol % of the $R^4$ radicals. The letter "a" is a positive number from 1.98 to 2.02. Preferably the organo-polysiloxane has at least two alkenyl radicals per molecule, especially with the alkenyl radicals accounting for 0.001 to 5 mol % of the $R^4$ radicals.

The organopolysiloxane of formula (2) may have any molecular structure and is preferably blocked at ends of its molecular chain with triorganosilyl radicals or the like, especially diorganovinylsilyl radicals such as dimethylvinylsilyl. In most cases, the organopolysiloxane is preferably a linear one although a mixture of two or more different molecular structures is acceptable.

The organopolysiloxane preferably has an average degree of polymerization of 100 to 100,000, especially 100 to 2,000, and a viscosity of 100 to 100,000,000 centistokes at 25° C., especially 100 to 100,000 centistokes at 25° C.

When the above silicone rubber composition is formulated to the addition reaction type, the organopoly-siloxane is one having at least two alkenyl radicals such as vinyl radicals per molecule, and the curing agent is a combination of an organohydrogenpolysiloxane and an addition reaction catalyst.

The organohydrogenpolysiloxane is preferably of the following average compositional formula (3):

$$R^5_b H_c SiO_{(4-b-c)/2} \tag{3}$$

wherein $R^5$ is a substituted or unsubstituted monovalent hydrocarbon radical of 1 to 10 carbon atoms, the subscript "b" is a number from 0 to 3, especially from 0.7 to 2.1, and c is a number from more than 0 to 3, especially from 0.001 to 1, satisfying $0 < b+c \leq 3$, especially $0.8 \leq b+c \leq 3.0$. This organohydrogenpolysiloxane is liquid at room temperature.

In formula (3), $R^5$ stands for substituted or unsubstituted monovalent hydrocarbon radicals of 1 to 10 carbon atoms, especially 1 to 8 carbon atoms, examples of which are the same as exemplified above for $R^4$, preferably those free of aliphatic unsaturation, and include alkyl, aryl, aralkyl and substituted alkyl radicals, such as methyl, ethyl, propyl, phenyl, and 3,3,3-trifluoropropyl among others. The molecular structure may be straight, branched, cyclic or three-dimensional network. The SiH radicals may be positioned at an end or intermediate of the molecular chain or both. The molecular weight is not critical although the viscosity is preferably in the range of 1 to 1,000 centistokes at 25° C., especially 3 to 500 centistokes at 25° C.

Illustrative, non-limiting, examples of the organohydrogenpolysiloxane include 1,1,3,3-tetramethyldisiloxane, methylhydrogen cyclic polysiloxane, methylhydrogen-siloxane/dimethylsiloxane cyclic copolymers, both end trimethylsiloxy-blocked methylhydrogenpolysiloxane, both end trimethylsiloxy-blocked dimethylsiloxane/methylhydrogen-siloxane copolymers, both end dimethylhydrogensiloxy-blocked dimethylpolysiloxane, both end dimethylhydrogensiloxy-blocked dimethylsiloxane/methylhydrogensiloxane copolymers, both end trimethylsiloxy-blocked methylhydrogen-siloxane/diphenylsiloxane copolymers, both end trimethylsiloxy-blocked methylhydrogensiloxane/diphenyl-siloxane/dimethylsiloxane copolymers, copolymers comprising $(CH_3)_2HSiO_{1/2}$ units and $SiO_{4/2}$ units, copolymers comprising $(CH_3)_2HSiO_{1/2}$ units, $(CH_3)_3SiO_{1/2}$ units and $SiO_{4/2}$ units, and copolymers comprising $(CH_3)_2HSiO_{1/2}$ units, $SiO_{4/2}$ units and $(C_6H_5)_3SiO_{1/2}$ units.

The organohydrogenpolysiloxane is preferably blended in the base polymer in such amounts that the ratio of the number of silicon atom-bonded hydrogen atoms (i.e., SiH radicals) on the organohydrogenpolysiloxane to the number of silicon atom-bonded alkenyl radicals on the base polymer may range from 0.1:1 to 3:1, more preferably from 0.2:1 to 2:1.

The addition reaction catalyst used herein is typically a platinum group metal catalyst. Use may be made of platinum group metals in elemental form, and compounds and complexes containing platinum group metals as the catalytic metal. Illustrative examples include platinum catalysts such as platinum black, platinic chloride, chloroplatinic acid, reaction products of chloroplatinic acid with monohydric alcohols, complexes of chloroplatinic acid with olefins, and platinum bisacetoacetate; palladium catalysts such as tetrakis(triphenylphosphine)palladium and dichlorobis(triphenylphosphine)palladium; and rhodium catalysts such as chlorotris(triphenylphosphine)rhodium and tetrakis(triphenylphosphine)rhodium. The addition reaction catalyst may be used in a catalytic amount, which is often about 0.1 to 1,000 ppm, more preferably about 1 to 200 ppm of platinum group metal, based on the weight of the alkenyl radical-containing organopolysiloxane. Less than 0.1 ppm of the catalyst may be insufficient for the composition to cure whereas more than 1,000 ppm of the catalyst is often uneconomical.

In the practice of the invention, silicone rubber compositions of the addition reaction curing type as mentioned above are preferred because they tend to cure to a lower hardness.

In the other embodiment wherein the silicone rubber composition is of the peroxide curing type, organic peroxides are used as the curing agent. The organic peroxide curing is useful when the organopolysiloxane as the base polymer is a gum having a degree of polymerization of at least 3,000. The organic peroxides used may be conventional well-known ones, for example, benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, t-butyl perbenzoate, 1,1-bis(t-butylperoxy)-3,3,5-trimethylcyclo-hexane, and 1,6-bis(t-butylperoxycarboxy)hexane.

An appropriate amount of the organic peroxide blended is about 0.01 to 10 parts by weight per 100 parts by weight of the organopolysiloxane as the base polymer.

In addition to the above-described components, the silicone rubber composition may further contain conventional additives.

Any conventional methods are employable for preparing and curing the electromagnetic wave absorbing silicone rubber composition according to the invention.

On use, the electromagnetic wave absorbing silicone rubber composition is molded and cured into a sheet. The sheet is typically disposed within an electronic equipment for suppressing electromagnetic noise within the equipment. Also, the electromagnetic wave absorbing silicone rubber composition to which is further imparted a heat transfer ability is molded and cured into a sheet, which is typically disposed between an electronic component and a heat sink in an electronic equipment for thereby suppressing electromagnetic noise and promoting heat transfer from the electronic component to the heat sink and hence, to the exterior.

EXAMPLE

Examples of the invention are given below by way of illustration and not by way of limitation.

Examples 1–13

Cured parts of silicone rubber containing soft magnetic powder and heat conductive powder were prepared as follows.

A vinyl-containing dimethylpolysiloxane blocked at either end with a dimethylvinylsiloxy radical and having a viscosity of 30 Pa·s at room temperature was selected as the base oil in order to give a liquid composition of the addition reaction type. To the base oil, as shown in Table 1, a surface treating agent selected from among (a) an organopolysiloxane containing at least one silicon atom-bonded alkoxy radical, silicon atom-bonded hydroxyl radical or functional organic radical in a molecule, shown below, (b) isopropyltristearoyl titanate as the titanate coupling agent, and (c) acetoalkoxyaluminum diisopropylate as the aluminum coupling agent was added in a predetermined amount per 100 parts by weight of soft magnetic powder and heat conductive powder combined. Then soft magnetic powder and heat conductive powder were added to the base oil. The mixture was agitated and mixed at room temperature. With agitation and mixing continued, the mixture was heat treated at 120° C. for 1 hour, obtaining a base compound.

The organopolysiloxanes (a) used were (a-1) to (a-5) wherein m is an integer of 5 to 100.

(a-1) $CH_3-((CH_3)_2SiO)_m-Si(OCH_3)_3$
(a-2) $CH_3-((CH_3)_2SiO)_m-Si(OC_2H_5)_3$
(a-3) $CH_3-((CH_3)_2SiO)_m-Si(CH_3)_2C_3H_6NH_2$
(a-4) $HO-((CH_3)_2SiO)_m-Si(CH_3)_2OH$
(a5) $CH_3-((CH_3)_2SiO)_m-Si(CH_3)_2OH$

The soft magnetic powders used were the iron alloys shown in Table 1. The heat conductive powders used were an alumina powder in the form of a mixture of Adomafine AO-41R and AO-502 (Adomatecs Co., Ltd.) and aluminum nitride UM-53E9 (Toyo Aluminium Co., Ltd.).

Next, an organohydrogenpolysiloxane having at least two hydrogen atoms directly attached to silicon atoms per molecule, a platinum group metal catalyst, and an acetylene alcohol addition reaction regulating agent were added to the base compounds, followed by mixing. The compositions were press molded and heat cured at 120° C. for 10 minutes, obtaining sheets of 1.0 mm thick. The amount of organohydrogenpolysiloxane added was adjusted such that a stack of two sheets of 6 mm thick obtained by press molding while heat curing at 120° C. for 15 minutes exhibited a hardness of 20 to 70 as measured by an Asker C hardness meter (Kobunshi Keiki K. K.). The Asker C hardness as achieved by such adjustment is shown in Table 2.

The sheets were examined for tensile strength, noise attenuation and thermal conductivity. The results are shown in Table 2.

The test method for examining a noise attenuation or noise suppressing effect is described below. Disposed in an electromagnetic dark chamber is a personal computer in which a sheet (40 mm long, 40 mm wide, 1.0 mm thick) formed from the silicone rubber composition is interposed between a CPU chip (operating frequency 500 MHz) and an aluminum heat sink. A receiver antenna is located in the chamber and spaced 3 m from the PC. This setting complies with the 3-m testing according to the Federal Communications Commission (FCC). The noise generated from the PC was measured by a suitable analyzer through the antenna. The difference between this noise measurement and the noise generated when the sheet of the silicone rubber composition is omitted is the noise attenuation.

Examples 14, 15

Using the surface treating agent and soft magnetic powder shown in Table 1, electromagnetic wave absorbing silicone rubber compositions were prepared and molded into sheets as in Examples 1–13, except that the heat conductive powder was omitted. The sheets were evaluated as in Examples 1–13, with the results being shown in Table 2.

Examples 16, 17

Using the surface treating agent, soft magnetic powder and heat conductive powder shown in Table 1, electromagnetic wave absorbing silicone rubber compositions were prepared and molded into sheets as in Examples 1–13, except that vulcanization was omitted. The sheets were evaluated as in Examples 1–13, with the results being shown in Table 2.

Because of the unvulcanized state, the sheets were less elastic and had an Asker C hardness of far less than 20.

As seen from Table 2, the electromagnetic wave absorbing silicone rubber composition of the invention can be adjusted in hardness to the range where Asker C hardness measurement is possible, especially the Asker C hardness is up to 80, in contact thermal resistance to a relatively low range, and in sheet strength to an acceptable level to handle in practice. A sufficient electromagnetic noise attenuation is achievable. When heat conductive powder is added, a thermal conductivity above 2.0 W/mK is ensured.

As seen from Table 2, an attempt was made to reduce the Asker C hardness of cured parts below 80 by adjusting the amount of organohydrogenpolysiloxane added, but failed. These cured parts had a hardness exceeding the upper limit of Asker C hardness measurement and lacked flexibility. These sheets were unacceptable on practical use. These results prove that the addition of silane coupling agent is ineffective for increasing the amount of soft magnetic powder and heat conductive powder loaded in silicone rubber.

Comparative Example 1

Using the soft magnetic powder and heat conductive powder shown in Table 1, an electromagnetic wave absorbing silicone rubber composition was prepared as in Example 1 except that the surface treating agent was omitted. In an attempt to mold the composition into a sheet, the material did not become a mass prior to molding because the soft magnetic powder and heat conductive powder were poorly wetted with the silicone rubber. It was impossible to mold the material into a sheet.

Comparative Example 2

Using the soft magnetic powder and heat conductive powder shown in Table 1, an electromagnetic wave absorbing silicone rubber composition was prepared and molded into a sheet as in Example 1 except that vinyltriethoxysilane belonging to the silane coupling agent was used as the surface treating agent. The sheet was evaluated as in Example 1, with the results being shown in Table 2.

TABLE 1

| | | Surface treating agent | | Soft magnetic powder | | | | Heat conductive powder | |
|---|---|---|---|---|---|---|---|---|---|
| | | Type | Amount (pbw) per 100 parts of powder | Type | Shape | Particle size (μm) | Content (vol %) | Type | Content (vol %) |
| Example | 1 | (a-1) | 2.6 | Fe—Cr | granular | 10 | 45 | alumina | 22 |
| | 2 | (a-1) | 1.7 | Fe—Cr | granular | 10 | 20 | alumina | 60 |
| | 3 | (a-1) | 4.0 | Fe—Cr | flake | 20 | 25 | alumina | 35 |
| | 4 | (a-2) | 2.3 | Fe—Al—Si | granular | 30 | 50 | alumina | 20 |
| | 5 | (a-2) | 1.7 | Fe—Cr—Si | granular | 11 | 60 | alumina | 15 |
| | 6 | (a-3) | 3.5 | Fe—Si | flake | 15 | 30 | alumina | 35 |
| | 7 | (a-3) | 2.1 | Fe—Cr | granular | 10 | 30 | alumina | 45 |
| | 8 | (a-4) | 2.7 | Fe—Cr—Si | flake | 20 | 30 | alumina | 40 |
| | 9 | (a-4) | 1.8 | Fe—Ni | granular | 10 | 45 | alumina | 30 |
| | 10 | (a-5) | 2.7 | Fe—Cr | flake | 20 | 30 | alumina | 40 |
| | 11 | (a-5) | 1.6 | Fe—Ni | granular | 10 | 30 | alumina | 50 |
| | 12 | titanate coupling agent | 0.4 | Fe—Al—Si | flake | 30 | 20 | alumina | 50 |
| | 13 | aluminum coupling agent | 0.7 | Fe—Cr | granular | 10 | 40 | aluminum nitride | 20 |
| | 14 | (a-1) | 6.7 | Fe—Cr | flake | 20 | 40 | nil | 0 |
| | 15 | (a-1) | 2.9 | Fe—Al—Si | granular | 10 | 30 | nil | 0 |
| | 16 | (a-1) | 1.4 | Fe—Cr | granular | 10 | 50 | alumina | 30 |
| | 17 | (a-3) | 1.6 | Fe—Cr—Si | flake | 20 | 35 | alumina | 45 |
| Comparative Example | 1 | — | 0.0 | Fe—Cr | granular | 10 | 45 | alumina | 22 |
| | 2 | silane coupling agent | 2.6 | Fe—Cr | granular | 10 | 45 | alumina | 22 |

TABLE 2

| | | Asker C hardness | Tensile strength (MPa) | Noise attenuation @ 1 GHz (dB) | Thermal conductivity (W/mK) |
|---|---|---|---|---|---|
| Example | 1 | 43 | 1.85 | −10.1 | 3.3 |
| | 2 | 62 | 1.33 | −5.8 | 10.1 |
| | 3 | 51 | 1.61 | −11.3 | 2.1 |
| | 4 | 48 | 1.91 | −11.2 | 3.8 |
| | 5 | 53 | 1.71 | −12.3 | 5.3 |
| | 6 | 55 | 1.94 | −13.2 | 3.5 |
| | 7 | 41 | 1.83 | −7.1 | 7.1 |
| | 8 | 44 | 1.52 | −12.9 | 3.5 |
| | 9 | 68 | 1.65 | −10.3 | 5.3 |
| | 10 | 38 | 1.63 | −11.5 | 3.9 |
| | 11 | 63 | 1.73 | −7.8 | 9.5 |
| | 12 | 50 | 1.65 | −9.4 | 4.1 |
| | 13 | 70 | 1.15 | −8.8 | 10.5 |
| | 14 | 30 | 2.31 | −14.2 | 1.0 |
| | 15 | 20 | 2.21 | −9.1 | 0.8 |
| | 16 | 1 | — | −10.3 | 8.9 |
| | 17 | 2 | — | −13.5 | 10.2 |
| Comparative Example | 1 | could not be molded into sheet | | | |
| | 2 | exceeding upper limit of measurement | 0.21 | −9.7 | 2.9 |

The electromagnetic wave absorbing silicone rubber composition comprising soft magnetic powder and a specific surface treating agent according to the invention has a satisfactory electromagnetic wave absorbing ability and is easily workable and flexible. When heat conductive powder is additionally blended, the electromagnetic wave absorbing silicone rubber composition has both a satisfactory electromagnetic wave absorbing ability and a satisfactory heat transfer ability and is easily workable and flexible. Placement of the composition in an electronic equipment suppresses electromagnetic noise. When the composition is additionally given a heat transfer ability, it also allows the heat generated by CPU to dissipate to the exterior, preventing the CPU from malfunction.

Japanese Patent Application No. 2000-324830 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An electromagnetic wave absorbing silicone rubber composition comprising
    a soft magnetic powder selected from the group consisting of iron and iron alloys in an amount of 5 to 80% by volume of the entire composition,
    a heat conductive powder selected from the group consisting of metals, metal oxides, metal nitrides, and silicon carbide in an amount of 10 to 85% by volume of the entire composition, and
    a surface treating agent in an amount of 0.1 to 10 parts by weight per 100 parts by weight of said soft magnetic powder, said surface treating agent being selected from the group consisting of (a) an organopolysiloxane containing at least one silicon atom-bonded alkoxy radical, silicon atom-bonded hydroxyl radicals or functional organic radical in a molecule, (b) a titanate coupling agent, and (c) an aluminum coupling agent.

2. The composition of claim 1 wherein said soft magnetic powder has a mean particle size of 0.1 to 100 $\mu$m.

3. The composition of claim 1 wherein said heat conductive powder has a mean particle size of 0.1 to 100 $\mu$m.

4. The composition of claim 1 which in the cured state has a thermal conductivity of at least 2.0 W/mK.

5. An electronic product comprising an electronic component and the composition of claim 1.

6. An electronic product comprising an electronic component, a heat sink, and the composition of claim 1.

7. The electronic product of claim 6, wherein said electronic component is a CPU.

8. A method of suppressing electromagnetic noise within electronic equipment which comprises the steps of forming a sheet of the electromagnetic wave absorbing silicone rubber composition of claim 1 and disposing said sheet within said electronic equipment.

9. A method of suppressing electromagnetic noise within electronic equipment having a heat sink and promoting heat transfer from an electronic component to the heat sink which comprises the steps of forming a sheet of the electromagnetic wave absorbing silicone rubber composition of claim 1 and disposing said sheet within said electronic equipment between said electronic component and said heat sink.

10. The method of claim 9, wherein said electronic component is a CPU.

11. The composition of claim 1, wherein component (a) is an organopolysiloxane represented by the formula:

$$R^1[Si(R^3)_2O]_mSi(R^3)_{3-n}R^2n$$

in which $R^1$ is OH or $R^3$, $R^2$ is OH, an alkoxy radical of 1 to 6 carbon atoms, or —$(CH_2)_pNH_2$ wherein p is an integer of 1 to 10, $R^3$ is a monovalent hydrocarbon radical of 1 to 16 carbon atoms, m is an integer of 1 to 100, and n is 1, 2, or 3.

12. The composition of claim 1, wherein titanate coupling agent (b) is isopropyltristearoyl titanate or tetra(2,2-diallyloxymethyl-1-butyl)bis(ditridecyl)phosphate titanate.

13. The composition of claim 1, wherein aluminum coupling agent (c) is acetoalkoxyaluminum diisopropylate.

14. The composition of claim 1, wherein an organopolysiloxane, of the following average compositional formula $$R^4_aSiO_{(4-a)/2}$$

in which $R^4$ is independently a substituted or unsubstituted monovalent hydrocarbon radical and the subscript "a" is a positive number from 1.98 to 2.02, is blended as a base polymer.

15. The composition of claim 14, wherein an organohydrogen polysiloxane and an addition reaction catalyst are added as a curing agent.

16. The composition of claim 14, wherein an organic peroxide is added as a curing agent.

17. The composition of claim 14, wherein the surface treating agent is added during the mixing of the organopolysiloxane with the soft magnetic powder and the heat conductive powder.

* * * * *